United States Patent [19]
Bogle et al.

[11] Patent Number: 6,138,819
[45] Date of Patent: Oct. 31, 2000

[54] ARTICLE TRANSFER ASSEMBLIES FOR CONVEYOR BELTS

[75] Inventors: David W. Bogle, Destrehan; Timothy J. Hicks, Ponchatoula; Sandra A. Christiana, Harahan; Paul L. Horton; Richard J. Sofranec, both of Metairie; Christopher G. Greve, Covington, all of La.

[73] Assignee: The Laitram Corporation, Harahan, La.

[21] Appl. No.: 09/093,894

[22] Filed: Jun. 9, 1998

Related U.S. Application Data

[60] Provisional application No. 60/049,823, Jun. 11, 1997.

[51] Int. Cl.[7] .................................................. B65G 47/74
[52] U.S. Cl. ........................................... 198/635; 198/325
[58] Field of Search ................................... 198/635, 325, 198/599

[56] References Cited

U.S. PATENT DOCUMENTS

| | | | |
|---|---|---|---|
| 807,362 | 12/1905 | DeLong. | |
| 2,576,633 | 9/1951 | Naylor | 198/188 |
| 3,137,382 | 6/1964 | Conover | 198/325 |
| 3,319,758 | 5/1967 | Goubie | 198/16 |
| 3,458,025 | 7/1969 | Earle | 198/325 |
| 4,832,187 | 5/1989 | Lapeyre | 198/851 |
| 5,083,659 | 1/1992 | Bode et al. | 198/853 |
| 5,215,182 | 6/1993 | Garbagnati | 198/635 |
| 5,291,982 | 3/1994 | Saito et al. | 198/325 |
| 5,322,158 | 6/1994 | Borsboom et al. | 198/635 |
| 5,370,213 | 12/1994 | Ahls et al. | 198/325 |
| 5,597,063 | 1/1997 | Bogle et al. | 198/635 |
| 5,613,597 | 3/1997 | Palmaer et al. | 198/853 |

FOREIGN PATENT DOCUMENTS

| | | |
|---|---|---|
| 0333309 | 9/1989 | European Pat. Off. . |
| 0542410 | 5/1993 | European Pat. Off. . |
| 1319778 | 9/1973 | United Kingdom . |

*Primary Examiner*—Christopher P. Ellis
*Assistant Examiner*—Joe Dillon, Jr.
*Attorney, Agent, or Firm*—James T. Cronvich

[57] ABSTRACT

A sectional article transfer assembly for receiving articles stripped from the conveying surface of a moving conveyor belt. The article transfer assembly includes, as a first piece, a transfer edge member having a base portion lying on and supported by a support frame and a belt-abutting portion that extends from the base portion to closely abut the conveying surface of a conveyor belt as it passes around a sprocket. The belt-abutting portion can have fingers or a beveled straight edge, for example. The transfer edge member mates with a second piece, a transfer plate member, which has a recessed portion that overlaps and mates with the base portion of the transfer edge member and a flat top article-transfer plate continuous and coplanar with an upper surface of the transfer edge member to form an extension of the conveying surface of the belt along which articles arc conveyed. In preferred versions, the two pieces can each be made of different materials, such as a durable material for the transfer edge member and a low-friction material for the transfer plate member. Other combinations of materials can be used to adapt the characteristics of the sectional transfer assembly to different operational demands.

35 Claims, 6 Drawing Sheets

ARTICLE TRANSFER ASSEMBLIES FOR CONVEYOR BELTS

This application claims the benefit of U.S. Provisional Patent Application No. 60/049,823, filed Jun. 11, 1997.

BACKGROUND

The invention relates generally to belt conveyors and, more particularly, to a passive article-transfer assembly for stripping articles from an off-loading end of a conveyor belt.

Endless conveyor belts are used widely to transport products, or articles. In many applications, the articles must be transferred from the conveying surface of a moving belt to another belt or to a stationary work station. Article transfer assemblies, such as finger transfer plates and dead plates closely abutting the belt as it passes around rotating sprockets or drums at an off-loading end of a conveyor belt, provide for a smooth continuation of product flow from the belt as it engages its sprockets or drums to begin its return trip.

A finger transfer plate includes a comb-like structure with teeth, or fingers, extending from a receiving platform into channels formed between longitudinal ridges defining the top conveying surface of a raised-rib conveyor belt. The transfer plate is disposed roughly tangent to the belt as it passes around its sprocket. By meshing with the ridges on the belt, the fingers strip articles from the conveying surface of the moving belt. The tops of the fingers and the receiving platform form a continuation of the conveying surface of the belt. Articles stripped from the moving belt push leading articles along the top surface of the finger plate for transfer to another belt or to a work station.

Dead plates perform a similar function. Lacking the fingers of a finger plate and the ability to mesh with the ridges of a raised-rib belt, a dead plate usually has a beveled edge that closely abuts, across a small gap, a belt passing over a sprocket. The top surface of the dead plate forms an extension of the belt's conveying surface for the transfer of conveyed articles off a conveyor belt.

One problem with dead plates and finger plates is the friction between the stationary flat surface of the plates and the articles pushing each other along that surface. The friction impedes the flow of the articles. Besides active means of urging products along the plates, various passive solutions have been tried. For example, extending the fingers of a finger transfer plate farther back into the platform area can decrease the friction. As another example, sets of rollers have been installed to replace the flat platform surface with a rolling surface. One of the shortcomings of these solutions is their susceptibility to damage or degraded performance in certain applications, such as in glass-handling, where pieces of glass can become wedged between the finger extensions or between the rollers. The wedged glass can cause the fingers or the ridges of a raised-rib conveyor belt to chip or break off or can cause the fingers to deflect and bind against the ridges, jamming the belt. Furthermore, extended fingers and rollers are also more difficult to clean, an important consideration in food-handling industries.

The long, slender fingers of finger plates are especially susceptible to breaking. Once enough fingers are broken, the entire finger plate must be discarded and replaced. For that reason, finger plates are often made of fairly strong and resilient materials. Unfortunately, the friction characteristics of such materials are not favorable. There is a tradeoff between high durability for long-lasting fingers and low friction for easy article transfer along the finger plate receiving platform.

Consequently, there is a need for an article transfer assembly that combines a durable, belt-abutting, product-stripping section with a low-friction receiving platform to facilitate the flow of product off a moving conveyor belt.

SUMMARY

This need and others are satisfied by a sectional article-transfer assembly having features of the invention, which includes a transfer edge member as a first piece and a transfer plate member as a second piece. The transfer edge member has a base portion that lies over and is supported by an assembly support frame. A belt-abutting portion extends out from the base portion away from the support frame to closely abut the article-carrying surface of a conveyor belt as it passes around a sprocket. The transfer edge member receives articles from the moving belt onto its upper surface. The transfer plate member overlaps the base portion of the transfer edge member. The plate member engages the base portion of the transfer edge member in a mating relationship. The plate member forms a generally flat top article-transfer surface that is substantially continuous and coplanar with the upper surface of the transfer edge member. In the event of damage to, say, the transfer edge member, the two parts can be separated and a replacement edge member mated with the plate member. There is no need to discard the entire assembly. In other words, a replaceable set of fingers, which has a relatively much shorter life, can be used with a long-life transfer plate.

In one version of the transfer assembly, the transfer edge member is made of a durable first material to impart strength to the edge member, such as fingers, and the transfer plate member is made of a low-friction second material to ease the flow of articles along the top article-transfer surface. In this way, favorable material characteristics are used where they are needed. In another version, a single transfer plate member admits multiple side-by-side transfer edge members.

In yet another version of the article transfer assembly, the transfer plate member has a recessed region interrupted by a boss projecting downward. The boss admits a fastener, such as a bolt, for attaching the plate to an assembly support frame. The base portion of the transfer edge member has an aperture with dimensions that allow it to receive the boss snugly. The mating of the boss in the aperture registers the transfer edge member to the transfer plate member on the support frame for precise alignment with the conveyor belt.

DRAWINGS

These and other features, aspects, and advantages of the invention are better understood by reference to the following description, appended claims, and accompanying drawings, in which:

DESCRIPTION

Figure 1:
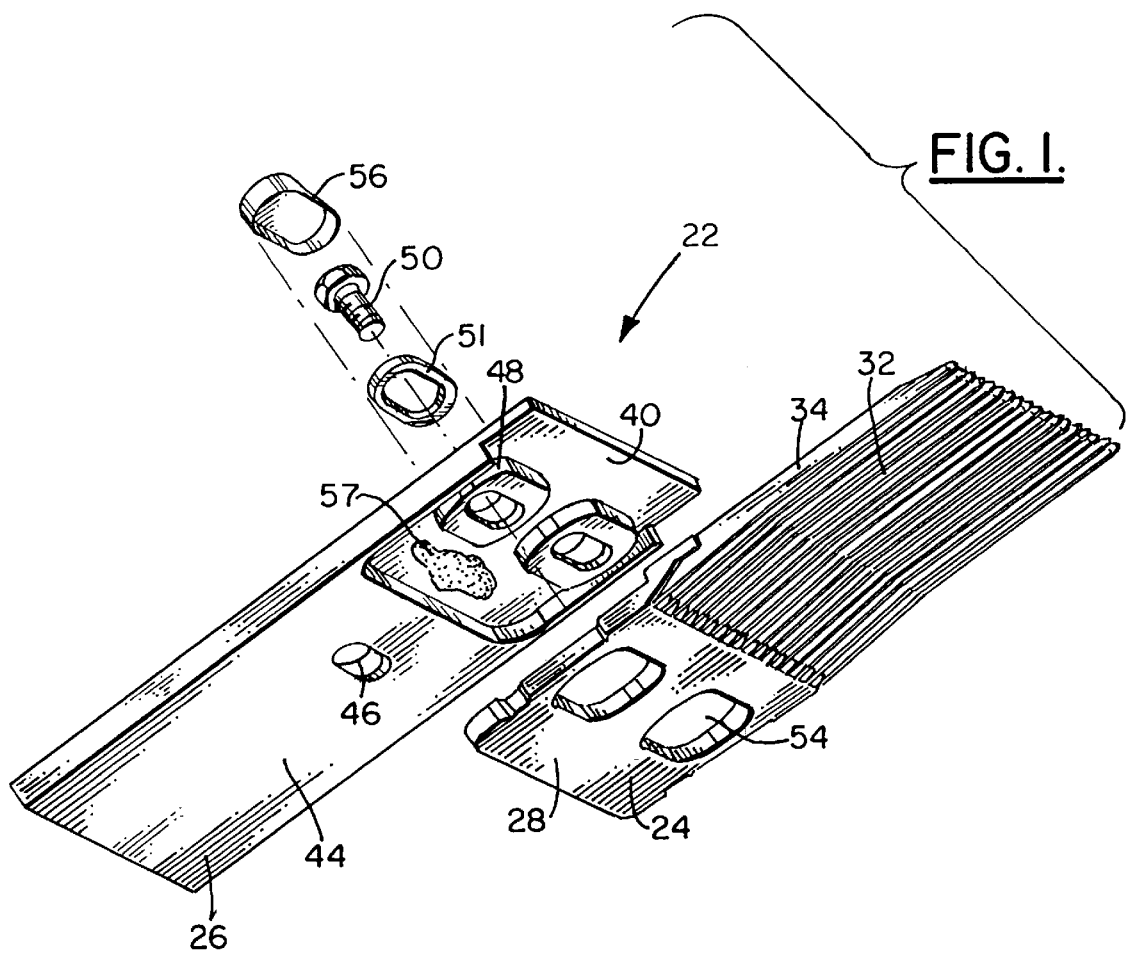
FIG. 1 is an exploded bottom perspective view of a finger transfer plate, including attachment hardware, embodying features of the invention and suitable for transferring articles from an off-loading end of a conveyor belt.
Figure 2:
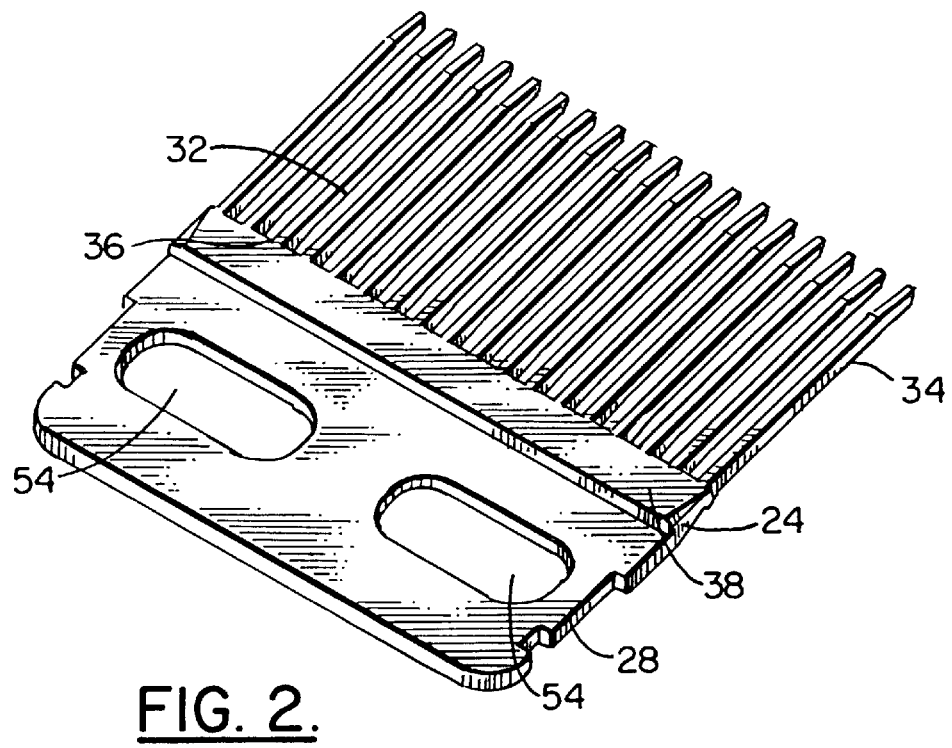
FIG. 2 is a top perspective view of the finger portion of the finger transfer plate of FIG. 1.
Figure 3:
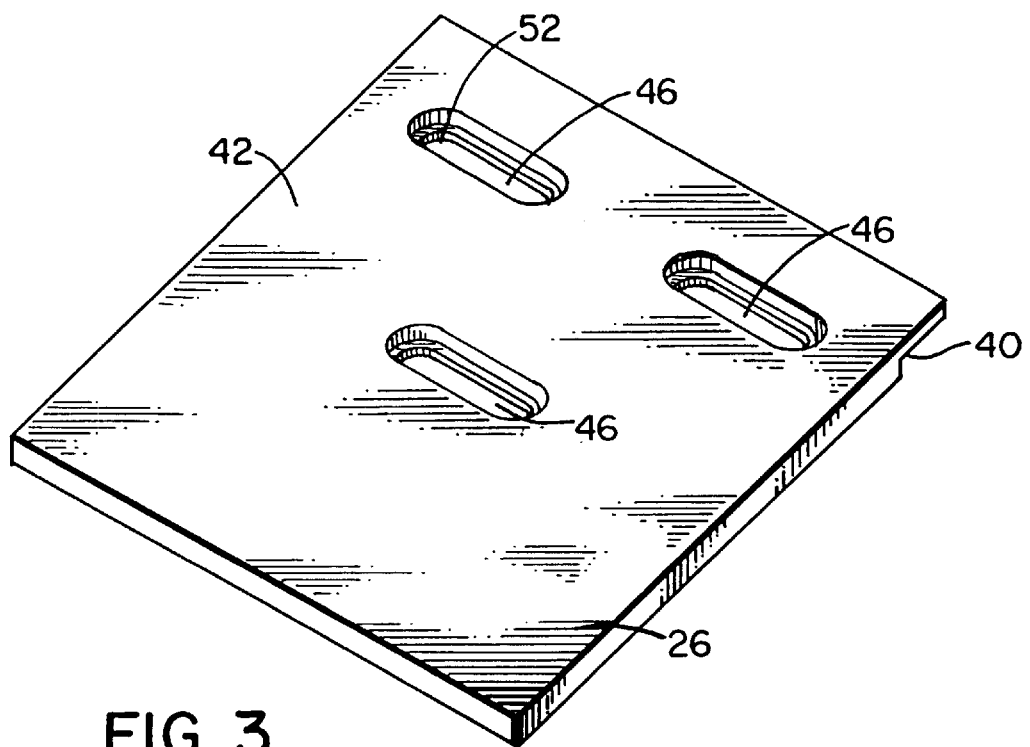
FIG. 3 is a top perspective view of the transfer plate portion of the finger transfer plate of FIG. 1.

An exemplary version of an article transfer assembly 20 embodying features of the invention is shown in FIGS. 1–3. The assembly includes a sectional finger transfer plate 22 composed of a transfer edge member 24 and a mating transfer plate member 26. The transfer edge member has a base portion 28 that overlies and is supported by an assembly support frame 30 (shown in FIGS. 5 and 8). Extending outwardly from the base portion is a belt-abutting portion 32. In the version shown in FIGS. 1–3, the belt-abutting portion includes a plurality of parallel fingers 34 that project into receptacle channels in the conveying surface of a conveyor belt to strip articles from the belt and transfer them along an upper surface 36 formed by the tops of the fingers and a flat portion 38 from which the fingers extend.

The transfer plate member 26 is generally rectangular in shape and of a constant thickness except for a recessed region 40 at one end. The plate-like transfer plate member forms a generally flat article-transfer surface 42 on one side and a bottom surface 44 on the other. Bosses 48 interrupting the recessed region 40 are co-extensive with the bottom surface 44. Openings 46, extending through the thickness of the transfer plate member at selected locations, including the bosses, admit fastener hardware, such as a bolt 50 and an elongated washer 51, to attach the article transfer assembly to the support frame. A recessed lip 52 formed along the perimeter of each opening 48 provides a contact surface for the washer and the head of the bolt. The thick bosses lend strength to the transfer plate member in the thinner recessed region so that it can accommodate the fastener hardware.

The base portion 28 of the transfer edge member includes apertures 54 sized to snugly receive the bosses 48 in the recessed region 40 of the transfer plate member. The shapes of the base portion 28 and the recessed region 40 are complementary to mate together to form a two-piece article transfer assembly. In this way, the transfer edge member is retained in precise registration with the transfer plate member and the support frame and associated conveyor belt. The bosses could alternatively be formed as part of the base portion of the transfer edge member and sized to fit through apertures formed in the recessed region of the transfer plate member. To avoid interruptions in the generally flat article-conveying surface, a fastener cap 56, having a flat upper surface, installs in the openings 46 in the transfer plate member with its top surface flush with the article-transfer surface 42. Where separable transfer edge and transfer plate members are not important, an adhesive 57 between the recessed portion and the base portion can be used to hold the two pieces of the finger transfer plate tightly together to prevent steps in the article transfer surface at the interface between the edge member and the plate member or to make a permanent unitary assembly.

Figure 8:
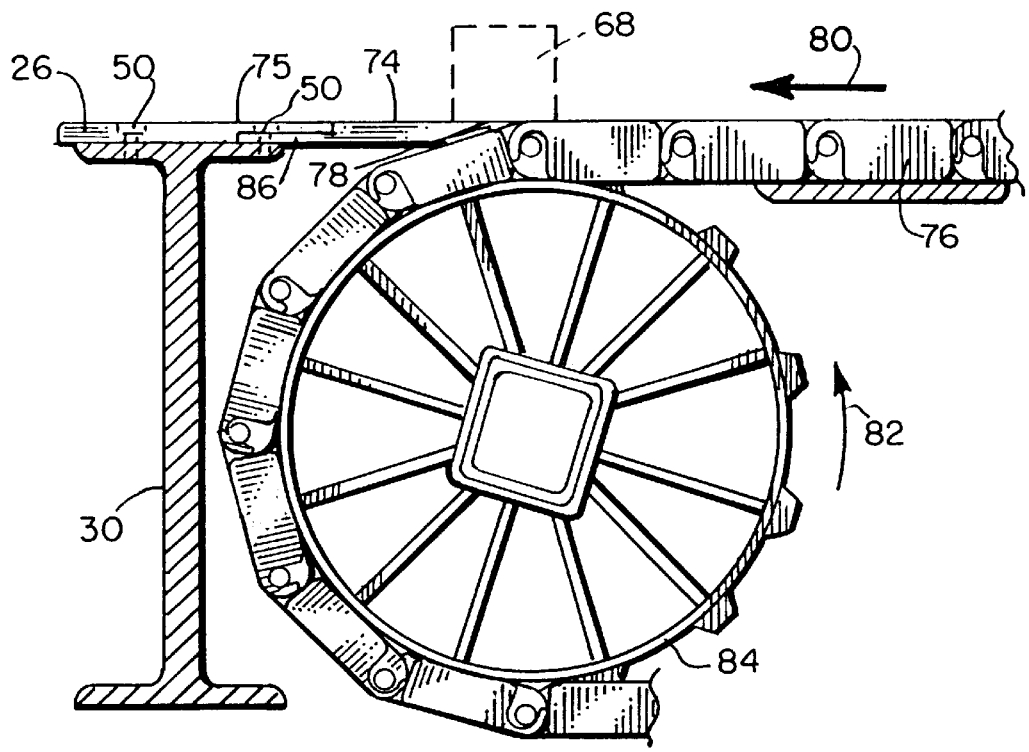
FIG. 8 is a partial side elevation view of a dead plate transfer assembly confronting the off-loading end of a conveyor belt and embodying features of the invention.
Figure 5:
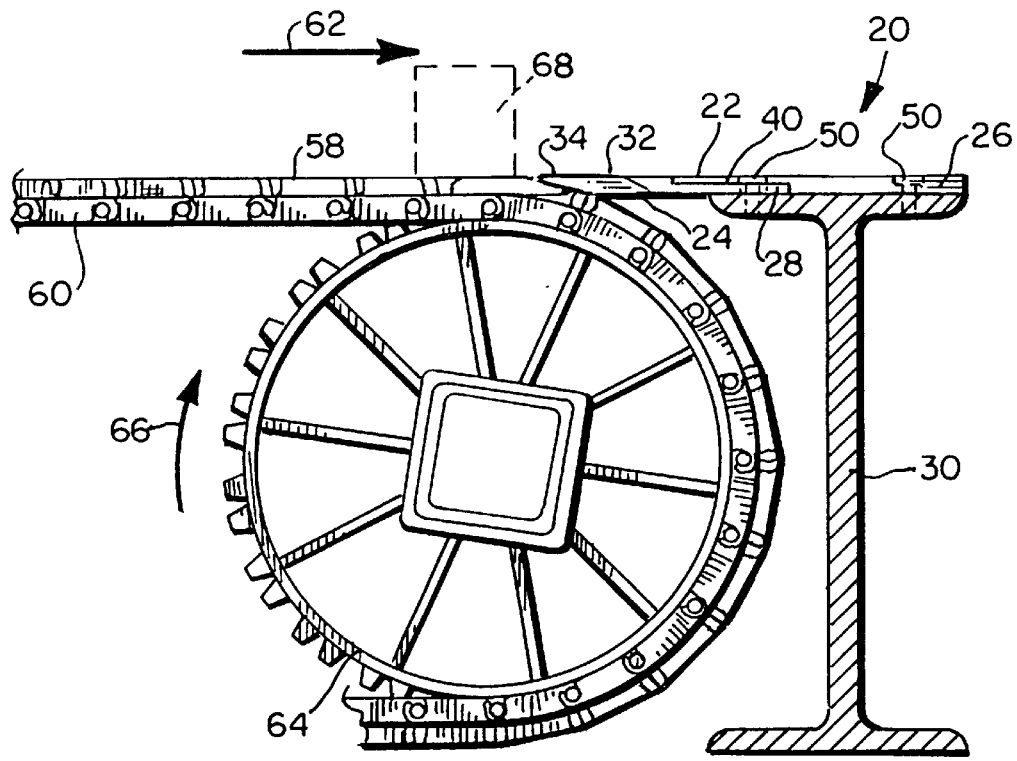
FIG. 5 is a partial side elevation view of a raised-rib conveyor showing the finger transfer plate of FIG. 1 confronting the off-loading end of the conveyor belt.
Figure 6:
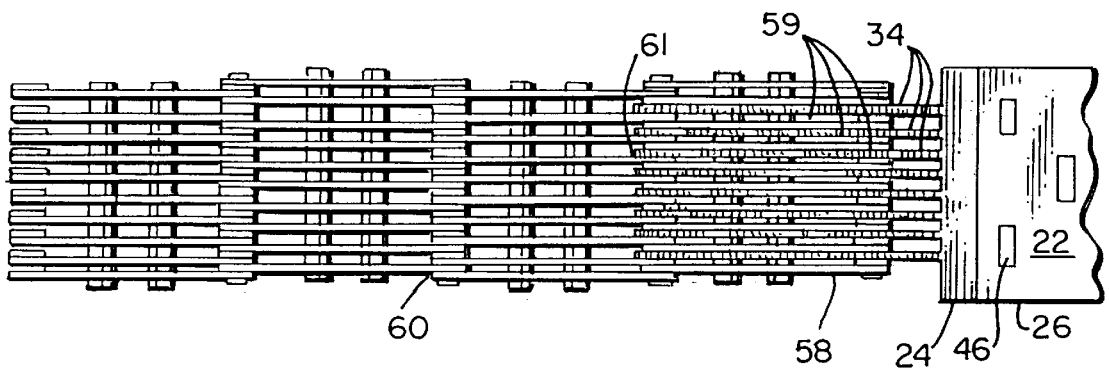
FIG. 6 is a partial top plan view of the raised-rib conveyor of FIG. 5.

As shown in FIGS. 5 and 8, the finger transfer plate 22 is attached to the assembly support frame 30 by fastener hardware, such as bolts 50. The recessed region 40 of the transfer plate member overlaps and mates with the base portion 28 of the transfer edge member. The base portion overlies and is supported firmly by the assembly support frame. The belt-abutting finger portion is cantilevered outwardly from the base portion. The tips 61 of the fingers 34 extend into receptacle channels 59 formed between columns of upstanding longitudinal ribs 58, or vanes, formed in the conveying surface of a raised-rib conveyor belt 60, such as a modular plastic conveyor belt sold by Intralox, Inc. of Harahan, La. The upper surface 36 of the transfer edge member formed by the tops of the fingers 34 and the flat backing portion 38 act as an extension of the raised-rib conveying surface of the belt so that articles 68 conveyed along the belt in the direction of the arrow 62 are stripped from the belt as it passes around a rotating element, such as a drive sprocket 64 or a drum, rotating clockwise as indicated by the arrow 66.

As seen in FIG. 2, the fingers 34 of transfer plates are long and slender to fit in the receptacle channels of raised-rib conveyor belts. For this reason, the fingers are often relatively fragile and susceptible to breaking as debris gets wedged between them and the belt. Consequently, conventional one-piece finger plates, especially those designed for harsh environments such as glass-handling applications, are often made of a strong plastic material, such as a nylon or glass-filled polyurethane composition. Unfortunately, nylon and polyurethane, while durable, have relatively high coefficients of friction, making transfer of articles across nylon or polyurethane surfaces difficult. To solve this problem, the transfer plate member 26 of the sectional article transfer assembly 20 of the invention can be made of a material having a low-friction characteristic, while the belt-abutting portion 32, which is subject to greater shear stresses, can be made of a different durable material. In this way, the advantages of durability are combined with the advantages of low-friction article transfer in a single transfer plate. The friction characteristics of the low-friction material of the transfer plate member should be at least as good as those of the durable material of the transfer edge member and as low as possible. Preferably, the coefficient of friction between the transfer plate and the articles ranges up to about 0.25 or so. Among suitable durable materials for the transfer edge member are polyurethanes, nylons, PPA's (polyphthalamides), peeks, steels, ceramics, thermosets, PEI's (polyetherimides), and LCP's (liquid crystal polymers). For added strength, the plastic materials can be filled with reinforcing fibers, such as glass or carbon. A preferred version of the transfer edge uses a polyurethane material filled with long glass fibers having lengths on the order of a centimeter. Although both combinations are possible, the percentage of fibers making up the fiber-filled polyurethane is preferably in a range of about 30%–50% by volume, with about 40% being most preferable. Suitable low-friction materials for the transfer plate member include acetals, UHMW's (ultra-high molecular weight polymers), TEFLON resin polymers, PBT's (polybutylene terephathalates, such as polyester), and surface-treated metals.

Figure 4:
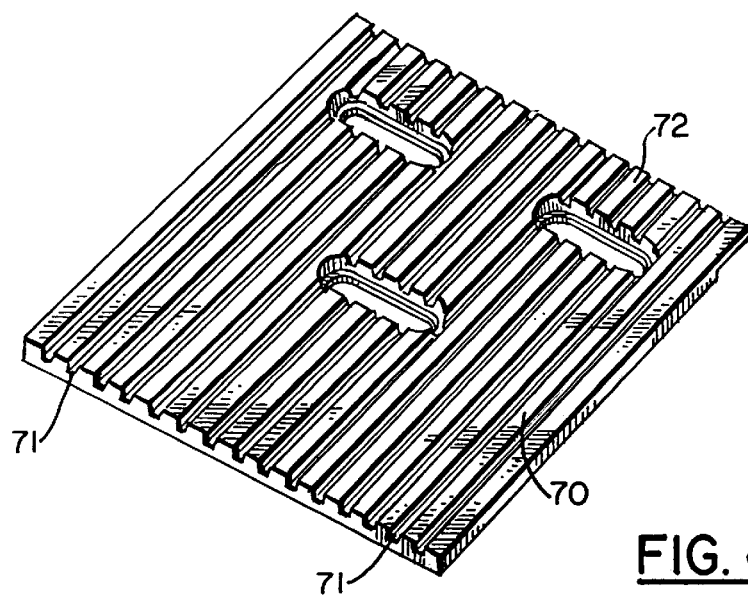
FIG. 4 is a top perspective view of another version of the transfer plate portion of a transfer plate as in FIG. 3 with a grooved article-transfer surface.

Another version of the article transfer assembly embodying features of the invention is shown in FIG. 4. The transfer plate member 70 is shown with a set of parallel, longitudinal grooves 71 in the top article-transfer surface 72. The grooves, formed by removing material from the article-transfer surface 72 and, thereby, from contact with transferred articles, cause a reduction in friction between articles and the transfer plate and facilitate the transfer of articles. The number and size of the grooves shown is merely exemplary. More parallel grooves could be cut into the article-transfer surface of FIG. 4 to further reduce friction.

Figure 7:
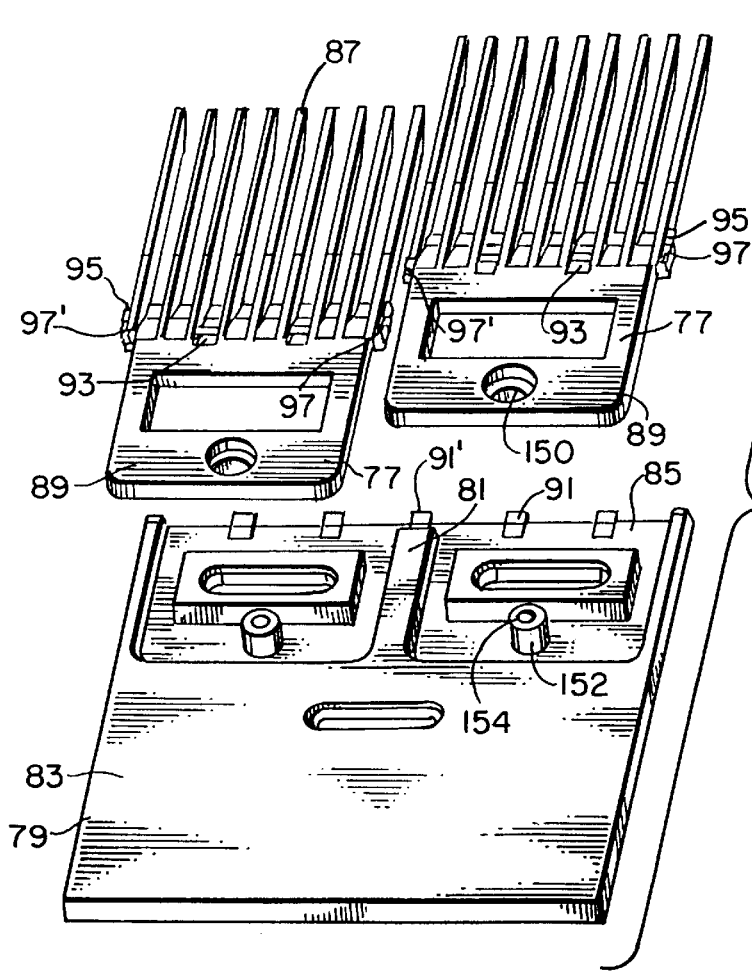
FIG. 7 is an exploded bottom perspective view of another version of a finger transfer plate embodying features of the invention, including multiple finger modules.

The article transfer assembly shown in FIG. 7 embodies further features of the invention, including multiple transfer edge members, such as finger modules 77. The transfer plate member 79 is similar to the plate member 26 of FIG. 3—the major difference being a peninsular structure 81 extending the bottom surface 83 into the recessed region 85. Besides lending support, the peninsular structure separates the base portions 89 of the two finger modules laterally from each other and helps register the fingers 87 in precise parallel alignment for non-interfering insertion into receptacle channels of an off-loading conveyor belt. Alternatively, the peninsular structure could be eliminated with the base portions of the finger modules abutting each other. Another feature of the article transfer assembly of FIG. 7 is retention structure to vertically align the top surfaces of the transfer edge members 77 to the article-conveying surface of the transfer plate member 79. Retention tabs 91 extend downward and outward from the leading edge of the transfer plate member for insertion into slots 93 formed in the web 95 of the fingers 87. The distal ends of the tabs 91 are retained by the underside of the web to prevent the transfer plate member from rising vertically away from the transfer edge member. This ensures that there is no step in the article-conveying surface at the interface between the edge and plate members that could cause transferred articles to tip. This retention structure could also be added to the transfer assembly of FIGS. 1–3 to achieve a similar advantage. Half-slots 97, 97' at opposite ends of the web form a complete slot with the corresponding half-slot of an adjacent edge module 77 to receive a central tab 91'. For a more permanent attachment of the finger modules to the transfer plate member, a recessed opening 150 is formed in each finger module 77. Stubs 152 protruding from the recessed region 85 fit through the recessed openings 150 of the finger modules when the sections are mated. The free ends 154 of the stubs can be melted or deformed by pressure (cold-staked) to flare out into the recessed openings 150 and securely attach the finger modules 77 to the transfer plate member 79. This method of attachment, if needed, is preferable to adhesives, which may not work so well with some materials. Although FIG. 7 shows a transfer plate member that accommodates two transfer edge members, it is clear that the structure shown could easily be extended to accommodate any number of side-by-side edge members.

Yet another version of an article transfer assembly having features of the invention is shown in FIG. 8. In this version, better adapted for use with conveyor belts not having raised ribs, a fingerless dead plate, belt-abutting portion 74 replaces the finger portion of the finger transfer plates. The belt-abutting portion of the article transfer assembly 75 abuts the belt 76 across a narrow gap 78. Articles 68 transported by the belt toward the dead plate in the direction of the arrow 80 by the belt rotatably driven in the direction of the arrow 82 by a sprocket 84 are stripped from the conveying surface of the belt by the scraper-like beveled edge of the belt-abutting portion 74. The beveled, or otherwise contoured, edge conforms to the path of the belt as it rounds the sprocket to minimize the width of the gap and to increase the strength of the contoured edge by maximizing the amount of material in the edge. In this version the base portion 86 can be identical to the base portion 28 of the version of FIGS. 1–3. The same transfer plate member 26 or 70 can be used as in FIGS. 1–5 to form a sectional dead plate transfer assembly for transferring articles from belts without raised ribs.

Figure 10:
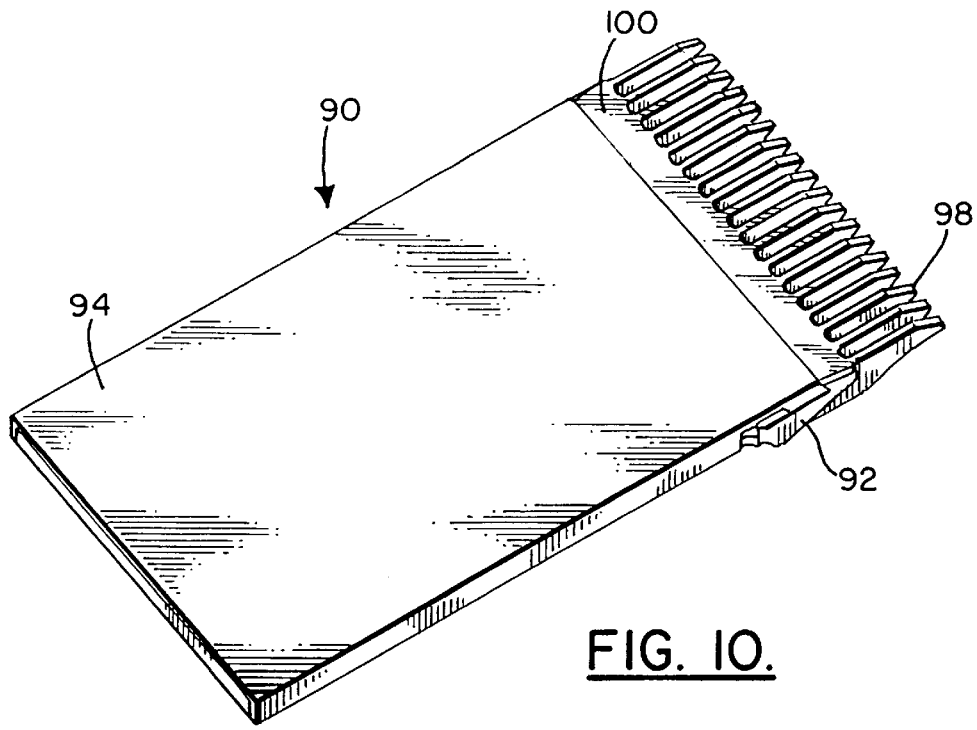
FIG. 10 is a top perspective view of the article transfer assembly of FIG. 9.
Figure 9:
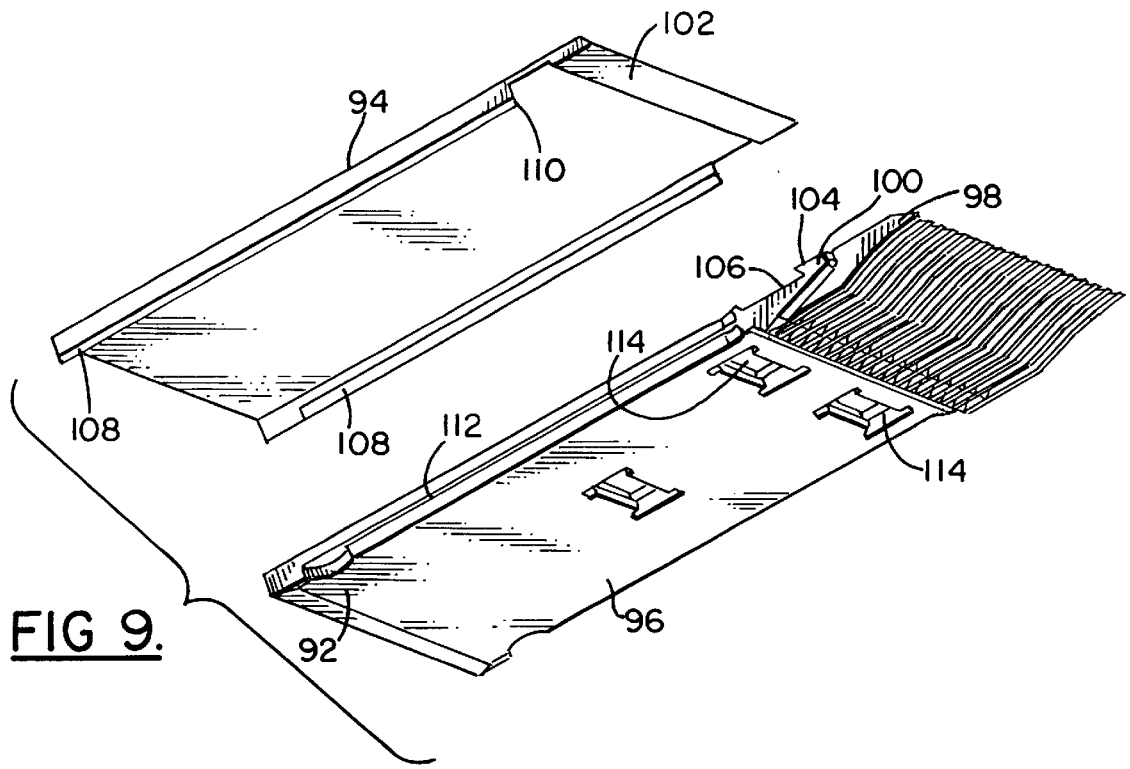
FIG. 9 is an exploded bottom perspective view of another version of an article transfer assembly embodying features of the invention and useful in transferring articles from a conveyor belt.

Still another version of a finger transfer plate embodying features of the invention is shown in FIGS. 9–10. The sectional transfer plate 90 includes a finger portion 92 and a plate cover 94. The finger portion has an extended base portion 96 from which a series of fingers 98 extend outwardly. A web 100 forms a top upper surface coplanar with the top of the fingers 98, which extend from the web. The base portion is recessed below the top upper surface only slightly to admit the thin sheet that forms the plate cover 94. The plate cover, which is preferably made of a low-friction material for easy transfer of articles, covers the base portion 96 of the finger member. The front edge 102 of the plate cover 94 is slightly thicker than the rest of the sheet and is beveled to slip under an oppositely beveled lip 104 and reside in a transverse slot 106 in the web 100. The overlapping engagement of the beveled edges makes a good interface between the two pieces of the transfer plate and helps keep the front edge from rising to cause a step at the interface that could tip articles. The cover 94 also includes a tab 108 extending downward along the side edges that terminate in retaining structure 110 that engages the horizontal roof 112 of an undercut groove in the base portion. Thus, the sheet-like plate cover 94 is snapped in place and retained on the base portion 96 of the transfer plate 90. The cover also covers the fastener hardware that attaches the assembly to a support frame through openings 114. Combining a finger portion including a base for attachment made of a strong, durable material with a plate cover made of a low-friction material provides the desirable advantages of a long-life finger transfer plate with low-friction article transfer.

Figure 11:
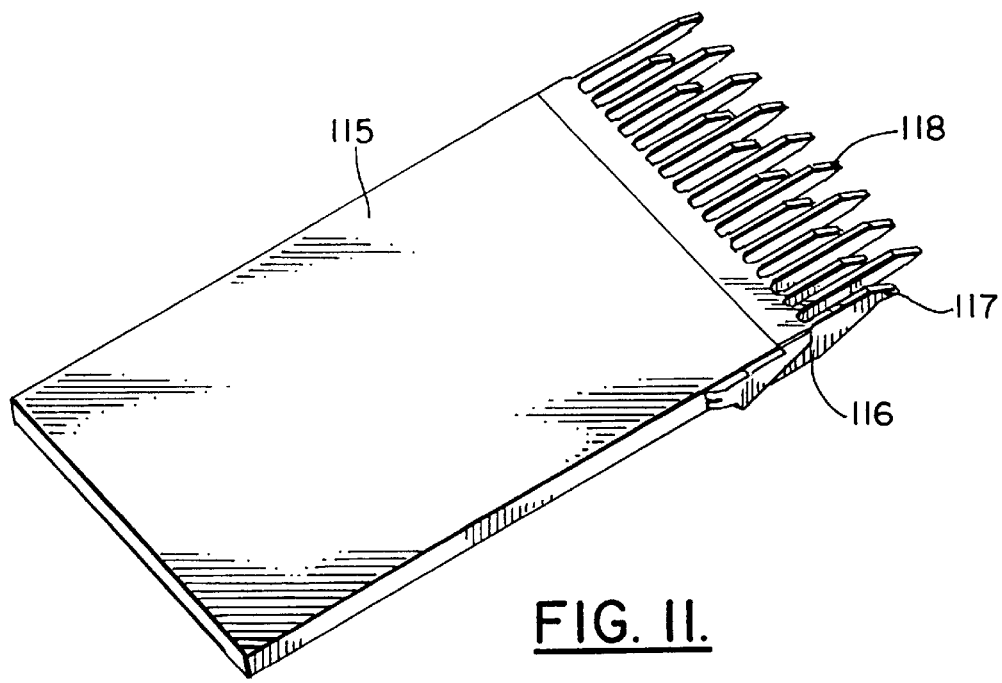
FIG. 11 is a top perspective view of another version of an article transfer assembly embodying features of the invention and especially useful in glass-handling applications.

As already mentioned, glass-handling is an especially grueling conveyor application because of the tendency of hard pieces of glass to become wedged between the fingers of the finger plate and the ribs of a raised-rib conveyor belt. The wedged glass can cause a finger to deflect and tightly sandwich a belt rib between the deflected finger and its neighboring finger. As a result, the belt can jam. The article transfer assembly 115 of FIG. 11 includes a finger portion 116 with fingers of staggered length: a first set of shorter fingers 117 alternating with a second set of longer fingers 118. Because the tips of the longer fingers extend beyond the tips of the shorter fingers, there can be no sandwiching of belt ribs between the tips of the longer fingers and the tips of the shorter fingers. Thus, the staggered arrangement helps reduce the incidence of belt jamming. Although the staggered finger arrangement is shown in FIG. 11 in a version of the transfer assembly similar to that of FIGS. 9 and 10, it could also be used in any of the other specific fingered versions described or even with conventional one-piece finger plates.

Figure 12:
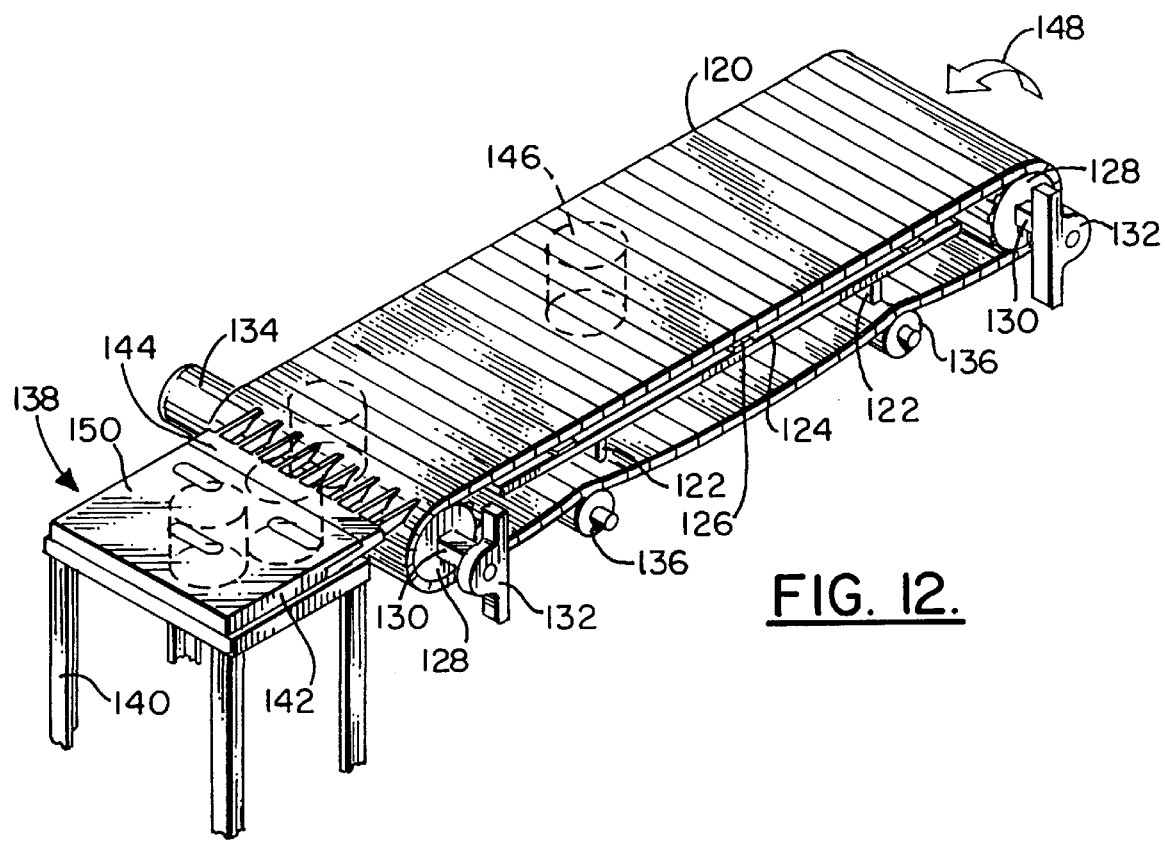
FIG. 12 is a partial perspective view of a conveyor system using a finger transfer assembly as in FIG. 1 to transfer articles from an off-loading end of a conveyor.

The use of the article transfer assemblies in a conveyor system is shown in FIG. 12. An endless conveyor belt 120 is supported by a conventional conveyor frame 122 (but generally not shown). The frame directly supports a carryway 124 whose surface includes wearstrips 126, typically made of plastic, on which the underside of the article-conveying portion of the belt slides. The belt is driven by rotating elements 128, such as sprockets or drums, mounted on shafts 130 rotatably supported at each end by bearing assemblies 132. At least one of the rotating elements is driven by drive means such as a motor 134. Passive return rollers 136 or shoes reduce sag in the returnway path of the belt. An article transfer assembly 138, including a support frame 140, has a sectional transfer plate 142 attached as shown to the support frame. The belt-abutting portion 144 of the plate, in this case fingers, abuts the belt at an off-loading end of the conveyor belt as it passes about the sprocket 128. The belt could include raised ribs, with the fingers extending into longitudinal channels between upstanding columns of raised ribs on the conveying surface of the belt. Articles 146 conveyed in the direction indicated by the arrow 148 are stripped from the conveying surface of the belt onto the coplanar top surface of the fingers of the belt-abutting portion 144. As consecutive articles are stripped from the moving belt, they push preceding articles along the plate member 150 of the article transfer assembly. Articles may then be removed from the transfer plate automatically or manually or transferred onto another belt at an exit end of the transfer assembly.

Thus, the novel sectional article transfer assembly embodying features of the invention provides a number of advantages. For example, the sectional construction of the transfer plates allows them to be made of different materials for a desirable combination of qualities: strength and durability in the grueling edge-abutting region and low friction in the article transfer region. The frequency of replacing damaged or broken fingers is reduced without suffering a penalty in high-friction article transfer. Another advantage is that the sectional construction allows a damaged finger portion to be separated from a plate portion and discarded and replaced without discarding an undamaged plate. Furthermore, dead plate and finger plate transfer edges could be used interchangeably with a common transfer plate member.

Although the invention has been described in detail with reference to preferred versions having at least the advantages mentioned, other versions are possible. For example, the pieces of the transfer plates could be made by molding or machining. The pieces need not be held to each other by adhesives or deformed stubs. They could be co-molded of different materials in a two-step molding process. They could be melted or fused together. They could include built-in retention details to mechanically interlock. In fact, where transfer edge replaceability is important, they could even be engaged by frictional engagement and mounting fasteners between the mating portions so that the pieces could be separated when one piece or the other is damaged. Many means of fastening the transfer plate to a support apparatus, besides bolts, are also possible, such as clamps and adhesives. Furthermore, transfer edge members and transfer plate members made of materials having different characteristics could be combined to adapt to a variety of applications. Therefore, as suggested by these examples, the spirit and scope of the claims should not be limited to the description of the embodiments described here in detail.

What is claimed is:

1. A finger transfer plate, comprising:
    a finger portion having a plurality of parallel fingers for projecting into receptacle channels in the conveying surface of a conveyor belt to receive articles onto the upper surface of the fingers; and
    a plate portion forming a generally flat plate having a top article-transfer surface, the plate portion attached to the finger portion and overlying an end of the finger portion opposite the tips of the fingers with the top article-transfer surface abutting the upper surface of the fingers to form a substantially continuous article-transfer surface; and
    wherein the finger portion is made of a durable first material to strengthen the fingers and wherein the plate portion is made of a low-friction second material to ease the transfer of articles along the top article-transfer surface.

2. A finger transfer plate as in claim 1, wherein the finger portion comprises at least two laterally spaced finger modules attached to the plate portion.

3. A finger transfer plate as in claim 1 wherein the finger portion and the plate portion are permanently attached to each other to avoid a step at the interface between the upper surface of the finger portion and the top article-transfer surface of the plate portion that could trip transferred articles.

4. A finger transfer plate as in claim 1 wherein the low-friction second material has a coefficient of friction relative to transferred articles of less than about 0.25.

5. A finger transfer plate as in claim 1, wherein the finger portion comprises a first set of shorter fingers alternating side by side with a second set of longer fingers.

6. A finger transfer plate as in claim 1 wherein the durable first material is a material selected from the group consisting of polyurethanes, nylons, polyphthalamides, polyetherimides, peeks, steels, ceramics, thermosets, and liquid crystal polymers.

7. A finger transfer plate as in claim 1 wherein the low-friction second material is a material selected from the group consisting of acetals, ultra-high molecular weight polymers, TEFLON resin polymers, polybutylene terephathalates, and surface-treated metals.

8. A finger transfer plate as in claim 1 wherein the second material is an acetal material and the first material is a polyurethane material.

9. A finger transfer plate as in claim 1, wherein the plate portion includes at one end a recessed region interrupted by a boss projecting downward from the recessed region, the boss defining an opening extending therethrough from the top article-transfer surface to admit a fastener for attaching the transfer plate to a mounting bracket.

10. A finger transfer plate as in claim 9, wherein the finger portion includes a base region opposite the tips of the fingers adapted to mate with the recessed region of the plate portion, the base region forming an aperture therethrough dimensioned to receive the boss in the plate portion to register the finger portion to the plate portion when the transfer plate is attached to the mounting bracket.

11. A finger transfer plate as in claim 1 wherein the durable first material is a polyurethane material filled with glass fibers.

12. A finger transfer plate as in claim 11 wherein the glass fibers constitute between about 30% and 50% of the volume of the finger portions.

13. A finger transfer plate as in claim 12 wherein the glass fibers constitute about 40% of the volume of the finger portions.

14. A finger transfer plate, comprising:
    a finger portion including a plurality of parallel fingers for projecting into receptacle channels in the conveying surface of a conveyor belt to receive articles onto an upper surface of the fingers; and
    a plate portion forming a generally flat plate having a top article-transfer surface, the plate portion attached to the finger portion at an end of the finger portion opposite the tips of the fingers with the top article-transfer surface abutting and coplanar with the upper surface of the fingers to form a substantially continuous article-transfer surface;

wherein the plate portion includes at one end a recessed region and wherein the finger portion includes a base region opposite the tips of the fingers adapted to mate with the recessed region of the plate portion with the recessed region overlying the base region, said finger portion made a durable first material and said plate portion made of a second low-friction material.

15. A finger transfer plate as in claim 14 wherein the finger portion is made of a durable material to strengthen the fingers and the plate portion is made of a low-friction material to case transfer of articles along the article-transfer surface.

16. A finger transfer plate as in claim 14 wherein the plate portion further comprises a boss projecting downward from the recessed region, the boss defining an opening extending therethrough from the top article-transfer surface to admit a fastener for attaching the transfer plate to a mounting bracket and wherein the base region of the finger portion forms an aperture therethrough dimensioned to receive the boss in the plate portion to register the finger portion to the plate portion when the transfer plate is attached to the mounting bracket.

17. A finger transfer plate as in claim 14 wherein the plate portion further comprises a retention tab extending downwardly and outwardly from an edge of the recessed portion and wherein the finger portion further forms a slot to receive the retention tab to be retained by the underside of the finger portion to prevent the plate portion from rising vertically relative to the finger portion.

18. A finger transfer plate as in claim 14, wherein the finger portion comprises a first set of shorter fingers alternating side by side with a second set of longer fingers.

19. An article transfer assembly for receiving articles transferred from the article-carrying surface of a moving conveyor belt, comprising:
   an assembly support frame;
   a first transfer edge member made of a durable first material and having a base portion overlying and supported by the assembly support frame and a belt-abutting portion extending from the base portion outwardly from the assembly support frame to closely abut the article-carrying surface of the moving conveyor belt moving around a sprocket to receive articles transferred from the moving conveyor belt onto an upper surface of the first transfer edge member; and
   a transfer plate member made of a second material having a low-friction characteristic that is at least as low as that of the durable first material, the transfer plate member mating in overlapping engagement with the base portion of the first transfer edge member to overlie the base portion and form a generally flat, low-friction, top article-transfer surface substantially continuous with the upper surface of the first transfer edge member to transfer articles from the moving conveyor belt along the upper surface of the first transfer edge member and the low-friction, top article-transfer surface of the transfer plate member.

20. An article transfer assembly as in claim 19 wherein the second material having a low-friction characteristic has a coefficient of friction relative to transferred articles of less than about 0.25.

21. An article transfer assembly as in claim 19 wherein the durable first material is a material selected from the group consisting of polyurethanes, nylons, polyphthalamides, polyetherimides, peeks, steels, ceramics, thermosets, and liquid crystal polymers.

22. An article transfer assembly as in claim 19 wherein the second material is a material selected from the group consisting of acetals, ultra-high molecular weight polymers, TEFLON resin polymers, polybutylene terephathalates, and surface-treated metals.

23. An article transfer assembly as in claim 19 wherein the second material is an acetal material and the first material is a polyurethane material.

24. An article-transfer assembly as in claim 19 wherein the transfer plate member comprises a thin sheet having attachments along an edge to attach to the transfer edge member so as to cover the base portion of the transfer edge member.

25. An article transfer assembly as in claim 19 wherein the transfer plate member and the first transfer edge member are permanently attached to each other to avoid a step at the interface between the upper surface of the first transfer edge member and the top article-transfer surface of the transfer plate member that could trip transferred articles.

26. An article transfer assembly as in claim 19 wherein the top article-transfer surface of the transfer plate member is grooved in the direction of article transfer to further reduce friction between the article-transfer surface and the transferred articles.

27. An article transfer assembly as in claim 19, further comprising fastener hardware and wherein the transfer plate member further includes fastener-receiving structure mating with the base portion of the transfer edge member, the fastener hardware cooperating with the fastener-receiving structure to affix the transfer plate member to the assembly support frame and to retain the mating overlapped base portion of the transfer edge member in fixed relation to the transfer plate member and the article-carrying surface of the conveyor belt.

28. An article transfer assembly as in claim 19 further comprising a second transfer edge member mating in overlapping engagement with the transfer plate member and laterally spaced from the first transfer edge member.

29. An article transfer assembly as in claim 19, wherein the belt-abutting portion comprises a first set of shorter fingers alternating side by side with a second set of longer fingers.

30. An article transfer assembly as in claim 19 wherein the first material is a polyurethane material filled with glass fibers.

31. An article transfer assembly as in claim 30 wherein the glass fibers constitute between about 30% and 50% of the volume of the transfer edge member.

32. An article transfer assembly as in claim 31 wherein the glass fibers constitute about 40% of the volume of the transfer edge member.

33. A conveyor system for conveying articles along a conveyor carryway path and transferring the articles off an end of the conveyor, comprising:
   a conveyor frame defining a conveyor path along its length;
   rotating elements supported at each end of the conveyor frame;
   an endless conveyor belt supported by the conveyor frame and articulating about the rotating elements at each end of the conveyor to form a top carryway supporting the belt transporting articles on an article-conveying surface along the length of the conveyor and a bottom belt returnway; and
   an article transfer assembly for receiving articles transferred from the article-conveying surface of the conveyor belt at an end of the conveyor carryway, comprising:

an assembly support frame confronting an off-loading end of the conveyor frame;

a transfer edge member made of a durable first material and having a base portion overlying and supported by the assembly support frame and a belt-abutting portion extending from the base portion outwardly from the assembly support frame to closely abut the article-conveying surface of the conveyor belt articulating about the rotating elements at the off-loading end of the conveyor to receive articles transferred from the article-conveying surface of the belt onto an upper surface of the transfer edge member; and a transfer plate member made of a low-friction second material mating in overlapping engagement with the base portion of the transfer edge member to overlie the base portion and form a generally flat, low-friction, top article-transfer surface substantially continuous with the upper surface of the transfer edge member to transfer articles from the belt along the upper surface of the transfer edge member and the low-friction, top article-transfer surface of the transfer plate member.

34. An article transfer assembly for receiving articles transferred from the article-carrying surface of a moving conveyor belt, comprising:

an assembly support frame;

a first transfer edge member made of a durable first material and having a base portion overlying and supported by the assembly support frame and a belt-abutting portion extending from the base portion outwardly from the assembly support frame to closely abut the article-carrying surface of the moving conveyor belt moving around a sprocket to receive articles transferred from the moving conveyor belt onto an upper surface of the first transfer edge member;

a transfer plate member made of a second material having a low-friction characteristic that is at least as low as tat of the durable first material, the transfer plate member mating in overlapping engagement with the base portion of the first transfer edge member and forming a generally flat, low-friction, top article-transfer surface substantially continuous with the upper surface of the first transfer edge member to transfer articles from the moving conveyor belt along the upper surface of the first transfer edge member and the low-friction, top article-transfer surface of the transfer plate member; and a second transfer edge member mating in overlapping engagement with the transfer plate member and laterally spaced from the first transfer edge member.

35. A finger transfer plate, comprising:

a finger portion having a plurality of parallel fingers for projecting into receptacle channels in the conveying surface of a conveyor belt to receive articles onto the upper surface of the fingers; and a plate portion forming a generally flat plate having a top article-transfer surface, the plate portion attached to the finger portion at an end of the finger portion opposite the tips of the fingers with the top article-transfer surface abutting the upper surface of the fingers to form a substantially continuous article-transfer surface;

wherein the finger portion is made of a durable first material to strengthen the fingers and wherein the plate portion is made of a low-friction second material to ease the transfer of articles along the top article-transfer surface, the finger portion comprising at least two laterally spaced finger modules attached to the plate portion.

* * * * *